United States Patent Office 3,206,317
Patented Sept. 14, 1965

3,206,317
FOOD SPOILAGE INDICATOR
Leonard Mark Golber, 1721 E. 86th Place, Chicago 17, Ill.
No Drawing. Filed June 15, 1961, Ser. No. 117,265
10 Claims. (Cl. 99—192)

This application is filed as a continuation-in-part of a prior application, entitled "Food Spoilage Indicator," Serial No. 730,500, filed April 23, 1958, now abandoned, and a prior co-pending application, entitled "Food Spoilage Indicator," Serial No. 808,291, filed April 23, 1959, now abandoned, and the entire disclosure of each of these prior applications, to the extent they are not inconsistent herewith, are hereby specifically incorporated by reference.

This invention relates to means and methods for visually detecting and indicating bacterial contamination and spoilage of foods and food products, etc. and, more particularly, is directed to means and methods for visually detecting significant increase in the number of bacteria normally present in food and food products or which are present or introduced as contaminants of such products when packaged.

More specifically, this invention is directed to means and methods whereby the multiplication of bacteria in food and food products, etc., may be detected visually without reliance upon and independently of the addition of bacteria or other organisms or enzymes not otherwise present in the particular food or food product involved.

With the advent of freezing as a method of preserving certain types of perishable food it is recognized that there is always the danger that pathogenic and other types of bacteria originally present in the food, or introduced as contaminants as a result of improper processing, handling or storage may multiply to unsafe or undesirable concentrations. It is well known that upon thawing of many types of frozen food products bacteria will frequently multiply rapidly with the result that the food may quickly become unfit for consumption. In fact, bacteria may multiply in certain types of frozen foods during prolonged storage even if the food is kept at well below freezing temperatures. From the time that a package of frozen food leaves the processor until it is opened for consumption there are numerous instances when the possibility of thawing is present and it is usually impossible for the consuming purchaser to determine whether or not the package has been previously thawed and thus possibly unsuitable for consumption. In many cases thawing for several hours and subsequent refreezing will promote bacterial growth to a dangerously high level such that the food is no longer fit to be eaten. Most important, however, is the fact that unless the food package is subject to undue discoloration or has an odor of spoilage, it is usually impossible for the consumer to know, with any reasonable degree of certainty, the fitness of the food in the package.

In the past, in order to furnish some sort of indication by which the consumer can detect the condition of the food, certain indicators known as "pacers" have been developed. The purpose of these pacers is to provide some sort of visual means for detecting the presence of bacteria in the food. However, in order for pacers of this type to function properly, the degree of bacterial contamination in the pacer must correspond to or be correlated with the degree of bacterial contamination of the food at the time of packaging or processing. Therefore, it has been necessary to determine the degree of bacterial contamination of the pacer and of the food in order that the contamination of the pacer and sensitivity thereof may be properly adjusted to that of the food. Since this procedure must be carried out for each batch of food, it is obvious that the attendant expense in bacterial assays on the pacer and food renders the use of pacers of this type uneconomical.

It has also been found in connection with pacers of the foregoing type that the growth rate of bacteria therein will not always accurately parallel the rate in the food being paced, and in many instances the bacteria in the pacer may even die completely during storage of the product while bacteria in the food continue to multiply. Consequently, these pacers have been found to be highly unreliable as indicators of the true condition of food products and from the point of view of warning the consumer. Moreover, pacers of this type are usually pre-prepared, assayed, and stored under refrigeration in order to inhibit the growth of bacteria therein. However, this procedure is not a satisfactory solution to the problem since even under refrigeration the bacterial content of the pacer may and frequently does change so that when the pacer is finally used its bacterial contamination is usually unknown, even if it were previously assayed at the time the pacer was prepared.

It is, therefore, a principal object of the present invention to provide a means and method for detecting and visually indicating bacterial contamination and growth in food and food products, which means and method do not depend upon the deliberate introduction of enzymes, bacteria, or other agents not otherwise present in the particular food or food product.

Other objects of the invention are the following: to provide a means and method of indicating visually an increase in the bacteria count of a food or food product in which the means for indicating the increase in the bacteria count is dependant upon and responsive to the particular bacteria present in the food or food product; to provide a means and method of indicating visually an increase in the bacteria count in a food product, by which means and method the need for foreign bacteria or other organisms or related agents is obviated; to provide an indicator for visually detecting the bacterial contamination of food, which indicator is economical to use and is highly reliable for the purposes intended; to provide an indicator of the type stated in which the degree of bacterial contamination of the indicator will be substantially the same as the bacterial contamination of the food, whereby the pacer or indicator will accurately signal the presence of dangerous and undesirably high levels of bacteria in the food, etc.; to provide an indicator of the type stated which eliminates the necessity of predetermining or assaying the bacterial contamination of either the indicator or the particular food being paced; and to provide an indicator responsive to indicate bacterial growth independent of temperature considerations.

Broadly speaking, the present invention resides in providing an indicator or pacer which consists of a sterile nutrient culture medium having a chemical agent or dye therein which changes color when bacteria grow in the nutrient. The nutrient, which may be in the form of a liquid or semi-solid mass is inoculated in any suitable manner by a sample of the food itself. This may be done by smearing a portion of the food over the nutrient or by any other suitable means as by swabbing, etc., so as to bring the nutrient and sample of the food into physical contact with each other. The bacterial contamination of the indicator thus formed will be a direct function of and will ordinarily parallel the bacterial contamination of the food during storage thereof. When the bacterial contamination of the indicator medium reaches an unsafe level, or a high concentration or increases to an appreciable extent, the bacteria therein will cause the dye to change color and to indicate thereby the presence of undesirably high bacteria concentrations in the indicator and the presence of corresponding undesirably high bacteria concentrations in the food itself. The color change of the dye may result from reduction of the dye, from a pH change occurring during bacterial growth, or from other chemical reactions associated with bacteria growth or enzymatic reactions, etc.

Preferred embodiments of the indicator of the invention are nutrient formulations to which pH-sensitive dyes and/or dyes responsive to oxidation-reduction reactions have been added. For the purpose of illustrative disclosure, and not by way of limitation or restriction, examples of indicator media are given below, along with the procedures for preparing the media.

In a preferred embodiment of this invention, a dye sensitive to chemical reduction and responding thereto by readily perceptible color change is used. A suitable nutrient medium of the type containing such an oxidation-reduction sensitive indicator is described below. In this preferred composition, the indicator dye itself is triphenyl tetrazolium chloride. All bacteria and related organisms and/or their metabolism products are subject and susceptible to oxidation, and in this sense they act and function as chemical reducing agents. When bacteria, including members of the genera Staphylococcus, Proteus, Bacillus, Salmonella, Escherichia, Aerobacter, and others are grown in a medium containing the triphenyl tetrazolium, the dye is reduced to produce a red pigment readily visible even in small concentrations, giving an unmistakable and reliable indication that bacterial growth has taken place.

Typical formulations of nutrient media containing reduction-sensitive dyes and the methods of preparing the same are given in the following examples:

EXAMPLE I

*Nutrient containing a reduction-sensitive agent*

| | Grams |
|---|---|
| Pork heart infusion | From 375.0 |
| Proteose peptone | 5.0 |
| Soy peptone | 6.5 |
| Yeast extract | 3.5 |
| Dextrose | 5.0 |
| Sodium chloride | 5.0 |
| Agar | 15.0 |
| Triphenyl tetrazolium chloride | 0.125 |

Distilled water, 1.0 liter.

The ingredients of the above formulation, exclusive of the water and the triphenyl tetrazolium chloride, are sifted together until thoroughly mixed. Fifty grams of the dry mixture is stirred into 1 liter of water and the solution autoclaved 15 minutes at 120° C. A one percent solution of triphenyl tetrazolium chloride is prepared in distilled water and the solution sterilized by passing it through a Berkefeldt filter. Alternatively, the sterile dye solution may be made up in alcohol and the alcohol then evaporated under reduced pressure.

A solution of the dye containing 0.125 gram of the dye is added to the prepared solution at a temperature of about 40° C. and stirred thoroughly but so as to avoid air entrainment. The final solution is then cast or molded by pouring into sterile tubes having a diameter of about ¾ inch. Upon hardening, the gel shrinks somewhat and may be removed as required, in a rod-like form. The rod is sliced into segments or sections which are then ready for inoculation and incorporation into the food package.

Other reduction indicator dyes suitable for use in the practice of the invention are dichlorophenyl indophenol and methylene blue. The procedures for preparing nutrient media containing these dyes are described below in Example II and Example III.

EXAMPLE II

*Nutrient containing a reduction-sensitive agent*

The dry ingredients of Example I are combined, omitting the dye. A solution of the ingredients is prepared and autoclaved as is Example I. With the solution at about 40° C., sterile air is whipped into or blown through the solution for about 15 minutes to remove any reducing agents present. A sterile solution of dichlorophenyl indophenol, sterilized by autoclaving or by some other suitable procedure, is then added to the solution of the other ingredients, and the preparation is cast as described in Example I.

EXAMPLE III

Still other reduction-sensitive dyes may be used in the practice of this invention, and methylene blue has been used successfully. The nutrient is prepared in the usual manner. The dye concentration should be sufficient to produce a light blue coloration when viewed by reflected light in layers 2 cm. thick.

While reduction-sensitive dyes are preferred in carrying out the teachings of this invention, other types of indicators or dyes also find utility in particular embodiments. For example, pH-sensitive indicators or dyes may be used. A representative chemical agent of this type is phenol red, and a nutrient composition in which this dye may be incorporated is given in Example IV.

EXAMPLE IV

*Nutrient containing a pH-sensitive agent*

| | Grams |
|---|---|
| Tryptone | 10.0 |
| Proteose peptone | 10.0 |
| Dextrose | 1.0 |
| Lactose | 10.0 |
| Sucrose | 10.0 |
| Agar | 13.0 |
| NaCl | 5.0 |
| $Na_2S_2O_3$ | 0.20 |
| $FeSO_4$ | 0.20 |
| Phenol red | 0.025 |

Distilled water 1.0 liter.

The triple sugar iron agar of the above formulation may be prepared according to procedures well known in the art, and the nutrient medium is of the type which promotes acid formation during growth. However, when particular conditions warrant, other types of media and other indicators may find special utility. In the light of the present invention, the selection of other pH-sensitive dyes will be within the capabilities of those skilled in the art.

The reduction-sensitive dyes such as triphenyl tetrazolium chloride, dichlorophenyl indophenol, methylene blue, etc. undergo color changes in response to the growth of bacteria and related organisms. The mechanism of the color change involves reduction of the dye and, therefore, care must be exercised to minimize air-induced auto reoxidation of these dyes in use. A preferred procedure is to seal the nutrient indicator disc from the atmosphere by covering with a transparent plastic film after the indicator medium has been inoculated and at the time of incorporating this indicator in the food package.

The pH-sensitive dyes and indicators undergo color changes in response to changes in the alkalinity or in the acidity of their environment. Depending upon the particular sustaining medium and upon the particular type of bacterial contamination, the change in the pH of the medium or of the food resulting from bacterial growth therein or discomposition thereof may be either to increase or to decrease the pH. But simple routine experimental procedures, well known to those skilled in the art, may be employed to determine, in any particular case, whether it is increase or whether it is decrease in pH which occurs in fact, and, in the light of the present teaching, these simple tests will enable one skilled in the art to select a suitable pH-sensitive indicator or dye for incorporation in the indicating medium.

Extensive research and many experimental testing programs have been carried out to establish the efficacy of the products and methods of this invention for the purpose intended. Special tests, as described below, establish that the rate of bacterial growth in the indicator nutrient accurately parallels the rate of bacterial growth in the food or food product.

A culture plate coated with sterile triple sugar from agar, which included phenol red, was prepared (see Example IV. A sample of frozen codfish about 1" x 1" x ¼" was used as the food to be paced. The surface of the fish sample was swabbed using a sterile cotton swab whereupon the swab was used to inoculate an area, approximately the size of a dime, on the culture plate. The fish sample and culture plate were thereafter allowed to remain at room temperature (70° F). A second area on the culture plate was inoculated in a like manner about 37 hours later, and third, fourth, and fifth areas on the culture plate were thereafter swabbed at about twelve hour intervals, respectively.

During the first 73 hours there was no visible indication of growth of bacteria colonies and no perceptible change on the culture plate. When observed about 12 hours after the fifth area had been swabbed, that is, after 73 hours, the plate showed the presence of bacterial colonies and a pink color appeared around the colonies. The colonies appearing in the first area were scattered and each successive area showed a progressively greater number of colonies although all of the colonies in all areas were approximately the same size. The fifth swabbed area was almost solidly covered with colonies. The results of this experiment establish that the bacteria in the food product and in the indicator medium grow at the same rate and that the appearance of colonies or change of color of the indicator corresponds with and parallels the formation of colonies in the food product.

In another series of tests and using another prepared culture plate of the type indicated above, four areas of the plate were inoculated by swabbings from the frozen fish sample. The second swabbing was made six hours after the first swabbing, and the third and fourth swabbings were made at 12 hour intervals. The culture plate and fish sample were allowed to remain at room temperature (70° F.) and the culture plate was observed two hours after the last swabbing, at which time no colonies were visible. The plate was again observed 11 hours after the last swabbing (i.e. after a total incubation time of 41 hours) and colonies appeared at all four areas. The distribution of the colonies was as follows:

Area of 1st swabbing _____ 1 colony.
Area of 2nd swabbing _____ 5 colonies.
Area of 3rd swabbing _____. 100 colonies (approx.).
Area of 4th swabbing _____. Solidly packed with colonies.

The colonies in each area were approximately the same size.

From the foregoing tests it was apparent that the size of the individual bacteria colonies was independent of the time of inoculation, the only difference in the several inoculated areas being the number of bacterial colonies present. Furthermore, all colonies appeared at approximately the same time.

There was a progressive increase in the number of colonies present in each successive area swabbed. The fact that all colonies became visible at the same time and the fact that the successively treated areas of the culture plate had progressively increasing numbers of colonies compels the conclusion that the rate of bacterial growth in the food sample is the same as the rate of bacterial growth in the nutrient medium or pacer of the invention. In neither series of tests were colonies visible on the fish sample itself, but since the fish sample was used to inoculate the nutrient, the fish sample obviously became progressively contaminated as indicated by putrifactive odor. The appearance of colonies on the nutrient or a color change in the indicator indicates that the concentration of bacteria in the food has reached an undesirable level. This fact has been verified by bacteria counts carried out on the food, and by odor. In other tests using reduction-sensitive agents in nutrient media, similar results were obtained.

In one suitable means of carrying out the present invention the sterile nutrient is prepared in tubes or containers. As required a sample of the nutrient, preferably about 1 cc., is placed in or on the food package at the same time the food is placed therein. To inoculate the nutrient, a small quantity (i.e. .001–.1 g.) of the food in the package is smeared across the nutrient by a swab or, if the food is handled by hand, the finger of the food handler may be wiped across the food and thereafter smeared across the nutrient to inoculate it. In this way any contamination of the food, even contamination by the handler, will be transferred to the indicator. In other instances, particularly where the food is pasteurized, a sterile swab or similar applicator can be used.

In order to disclose the invention in full detail but not as constituting a limitation of the invention in any way, a preferred method of carrying out the present invention is described below.

A nutrient medium, prepared in accordance with the foregoing procedures, is stored in a sterile container or dispensing device adjacent the food packaging table. As required, a disc or section of the gelled medium is removed from the dispenser and incorporated into the food package. In a typical procedure, the food handler removes an indicator disc from the dispenser and places it on the food package, preferably in a shallow open-top dish. A transparent covering film is placed over the dish and the final transparent wrap is then applied to the food package. In handling the indicator disc, the food handler automatically and naturally inoculates the indicator medium with the food being packaged. Any bacteria present in the food are thus transferred to the indicator medium and any subsequent growth of bacteria in the packaged food will be paralleled by growth of the same bacteria, at the same rate, in the medium, as previously explained. Any significant increase in the bacterial contamination of the indicator will cause a readily perceptible visual change in the appearance of the indicator medium and this visual change will denote significant increase in the bacterial contamination of the packaged food itself.

As a method of inoculation of the indicator medium the procedure described above is satisfactory. In practice, the food handler wipes a finger across the food and then across the nutrient. If preferred, and particularly where a pasteurized food product or a "sterile" food pack is involved, a sterile swab or similar applicator may be used to inoculate the medium with the food product.

The amount of inoculating food used is not critical, and the efficacy of the method of the invention is essentially independent of the actual quantity of food transferred to the nutrient medium. A very small quantity of inoculant is sufficient, and 1 milligram samples have effected satisfactory transfers. In other tests the transfer of 100 milligrams or more has given good results. The pacer or indicator disc may, if desired, be encapsulated in a sterile transparent material and placed on the outside of the package or within the package or may be associated with the package in any suitable manner in which the indicator can be rendered visible from outside of the package.

If bacteria should multiply in the food they will also multiply in the pacer or indicator, and the rate of bacterial growth in the food will be paralleled by the rate of bacterial growth in the pacer as pointed out above. If the bacterial growth in the food reach a dangerous high level, the bacteria in the indicator will reach a corresponding level and the bacteria therein will reduce the indicator dye in the nturient (or will affect a pH-sensitive dye) causing the dye to change color. Thus, upon inspection of the indicator, the observed color change will signal the presence of a high level of pathogenic or other bacteria in the food and warn the consumer that the food is not fit for consumption. Furthermore, the indicator will reveal the presence of bacteria in the food even though bacterial colonies may not be visible in the food itself.

The sensitivity of the nutrient can be adjusted in accordance with the type of food being paced. In the case of the pH-sensitive agents this may be accomplished by buffering the nutrient with a suitable buffering agent, such as sodium bicarbonate. In the case of both pH-sensitive and reduction-sensitive agents, sensitivity may be regulated by adjusting the quantity of indicator in the nutrient. The sensitivity of the nutrient can be adjusted by using indicators which themselves have different sensitivities, and by incubation of the indicator after inoculation. Tests made in accordance with the procedures described above may be made with various types of foods to determine the proper sensitivity of the nutrient, and once determined, it is not necessary to make assays of each batch of food. Moreover, it is possible to inoculate samples of nutrient which are thereafter retained by the food processor in order to show the contamination of the food at the time of packaging.

In connection with the present invention it should also be noted that, even in the absence of an indicator in the nutrient, the visible appearance of bacterial colonies in the medium will signal the presence of bacteria in the food sample. If the pacer is incubated for a limited period of time, such incubation would facilitate the appearance of colonies.

It has been found that pacers prepared in accordance with the present invention are extremely reliable in operation and can be prepared at relatively low cost. As pointed out, the pacers can embody dyes and other chemical agents which are not particularly sensitive to pH changes. These pacers will indicate the presence of toxic bacteria even though the food may have been treated with or contain ascorbic or other food acids or other additives affecting the pH.

While disclosures of preferred embodiments of the products and of preferred methods for preparing the products of the invention have been provided, it will be apparent that numerous modifications and variations thereof may be made without departing from underlying principles of the invention. It is therefore desired by the following claims to include within the scope of the invention all such variations and modifications by which substantially the results of this invention may be obtained through the use of substantially the same or equivalent means.

I claim:

1. An indicating device for a refrigerated food package comprising a nutrient medium distinct from food in said food package and out of direct contact therewith but inoculated with said food to provide a sample of the organism population of said food in said nutrient, said food and said nutrient medium being essentially equally receptive to and equally supporting organism growth; a reduction-sensitive chemical signalling agent within said nutrient medium, said agent being responsive to chemical reduction by reaction with bacteria and other organisms and their metabolism products to provide a readily visible change in the appearance of said nutrient medium, whereby growth of bacteria and other organisms in said nutrient medium parallels and proceeds at essentially the same rate as growth of the same species of organisms in said food, and whereby growth of said bacteria and other organisms causes reduction of said chemical signalling agent in said nutrient medium to provide a visual indication of a substantial increase in the contamination of said nutrient medium and to denote a corresponding increase in the contamination of said food irrespective of any direct contact between said nutrient medium and said food.

2. The method of preparing a food product having associated therewith an indicator for signalling increase of organisms in said food product and comprising the steps of preparing a sterile nutrient medium other than said food product, incorporating throughout said nutrient medium a chemical signalling agent responsive to the growth of bacteria and other organisms to produce a readily perceptible visual change in the appearance of said nutrient medium, inoculating said sterile nutrient medium containing said chemical agent with said food to provide in said nutrient a sample of the organism population of said food product to ensure that any bacteria and other organisms present in said food product will also be present in said nutrient medium, packaging said inoculated nutrient medium with said food product, in out of contact relation therewith, said food product and said nutrient medium being essentially equally susceptible to and equally sustaining growth of organisms, whereby throughout the storage life of said food product said nutrient medium will be responsive to and will indicate increase in bacteria and other organisms therein to denote a corresponding increase in the same bacteria and other organisms in said food product.

3. In food packaging and distribution wherein an originally sterile nutrient indicator medium other than food itself is wrapped and packaged in out of direct contact relation with said food, the method of assuring accurate correlation of the indicating response of the indicator medium with organism contamination of said food which includes the step of inoculating the sterile nutrient indicator medium with a sample of said food to provide in said medium the same organism population of said food at the time the food is wrapped and packaged.

4. An indicator for visually detecting bacterial contamination of food and adapted to be associated with a package of said food and out of direct contact therewith, said indicator comprising a nutrient culture medium; chemical signalling means in said medium and responsive to bacterial growth to produce a signal indicating an increase of bacteria in said food; a sample of said food present in said medium as an inoculant thereof to provide in said medium a sample of the bacteria population of said food, said signalling means being responsive to bacterial growth to signal said growth independently of direct contact of said nutrient medium with said food.

5. An indicator for visually detecting bacterial contamination of food and adapted to be associated with a package of said food and out of direct contact therewith, said indicator comprising a nutrient culture medium; a signalling dye distributed throughout said medium, said dye being selected from the group consisting of dyes which undergo visible color change in response to increase in bacteria in nutrient media containing said dyes; a sample of said food present in said nutrient medium as an inoculant thereof to provide in said medium a sample of the organism population of said food, said signalling dye being responsive to organism increase to signal said increase independently of direct contact of said nutrient medium with said food.

6. An indicator for visually detecting bacterial contamination of food and adapted to be associated with a package of said food and out of direct contact therewith, said indicator comprising a nutrient culture medium; a bacteria-responsive reducible dye distributed throughout said nutrient medium; a sample of said food present in said medium as an inoculant thereof to provide in said medium a sample of the bacteria population of said food; said nutrient medium being responsive to bacterial growth through reduction of said dye to produce a visible change of color of said dye independently of direct contact of said medium with said food.

7. An indicator for visually detecting the bacterial contamination of food and adapted to be associated with a quantity of said food and out of direct contact therewith, said indicator comprising an initially sterile nutrient culture medium; a signalling dye dispersed throughout said medium, said dye being reactive with bacteria to signal visually growth of bacteria in the nutrient medium, said medium containing a sample of said food as an inoculant thereof to provide in said medium a sample of the bacteria population of said food; and said nutrient culture medium being characterized in that the rate of bacterial increase therein after inoculation of said medium with said food is substantially a direct function of the rate of bacterial increase in said food irrespective of any direct contact between said nutrient and said food.

8. A food package comprising a food, a nutrient medium other than said food and out of direct contact therewith, said nutrient medium containing a sample of said food as an inoculant thereof to provide in said medium a sample of the bacterial population of said food; a chemical signalling agent distributed throughout said nutrient medium for signalling an increase in organisms in said nutrient medium, said signalling agent being selected from the group of bacterial-growth-responsive chemicals consisting of reduction-sensitive dyes and related compounds and pH-sensing dyes and indicators; whereby said food and said nutrient medium contain the same bacteria and other organisms, and said food and said nutrient medium are essentially equally susceptible to and essentially equally support growth of organisms present therein, and whereby growth of bacteria and other organisms in said food effects a visible change in the appearance of said nutrient medium in response to chemical reaction between said signalling agent and said organisms and metabolic by-products thereof to indicate increase in the concentration of bacteria and other organisms in said medium and a corresponding increase in the concentration of the same species of bacteria and other organisms in said food irrespective of any direct contact between said nutrient medium and said food.

9. In a frozen food package including a food product and a thaw indicator, the improvement wherein said thaw indicator comprises a nutrient medium other than said food product and out of direct contact therewith, said nutrient medium containing a sample of said food product as an inoculant thereof to provide in said medium a sample of the organism population of said food product; a chemical signalling agent incorporated in said nutrient medium and responsive to the growth of bacteria and other organisms to provide a visible change in the appearance of said nutrient medium; whereby organisms present in said nutrient medium are the same species as organisms present in said food product ensuring thereby equal and paralleling rates of increase of organisms in said food product and in said nutrient medium, and whereby visible changes in said nutrient medium indicating increase in the bacterial contamination of said nutrient medium denote an equivalent increase in the bacterial contamination of said food product irrespective of any direct contact between said nutrient medium and said food product.

10. A method of preparing a food spoilage indicator for use with a package of food, which method comprises preparing a semi-solid sterile nutrient culture medium other than the food of the package, inoculating the nutrient culture medium with a sample of said food by contacting said medium with a sample of said food to provide in said medium the same organism population present in said food, and, thereafter, separating said medium from direct contact with said food; whereby organism contamination of the nutrient is thereafter substantially a direct function of organism contamination of said food, said nutrient medium being responsive to organism growth to signal visually the growth of organisms in said nutrient medium and to denote a corresponding growth of the same species of organisms in said food.

References Cited by the Examiner

UNITED STATES PATENTS 2,485,566 10/49 Clark.
2,567,445 9/51 Parker.
2,950,202 8/60 Brockman.

OTHER REFERENCES

Tanner: Bacteriology, pp. 97, 98 and 269, John Wiley and Sons, Inc., New York, N.Y. (1938).

A. LOUIS MONACELL, *Primary Examiner.*